United States Patent [19]
Tanaka et al.

[11] Patent Number: 5,290,645
[45] Date of Patent: Mar. 1, 1994

[54] BATTERY SEPARATOR AND A BATTERY

[75] Inventors: Masanao Tanaka; Nobutoshi Tokutake; Yoshihiko Kondo; Hiroaki Yamazaki; Masaki Hirooka; Koji Kimura, all of Ibaraki, Japan

[73] Assignee: Japan Vilene Co., Ltd., Tokyo, Japan

[21] Appl. No.: 36,811

[22] Filed: Mar. 25, 1993

[30] Foreign Application Priority Data

| Mar. 26, 1992 | [JP] | Japan | 4-100459 |
| May 20, 1992 | [JP] | Japan | 4-152673 |
| Sep. 21, 1992 | [JP] | Japan | 4-276634 |
| Nov. 27, 1992 | [JP] | Japan | 4-341114 |
| Jan. 26, 1993 | [JP] | Japan | 5-29874 |

[51] Int. Cl.$^5$ .................................... H01M 2/16
[52] U.S. Cl. ...................................... 429/144; 429/249
[58] Field of Search ............... 429/247, 249, 253, 254, 429/206, 142, 144; 525/56, 61; 568/579, 583; 428/411.1

[56] References Cited

U.S. PATENT DOCUMENTS

| 4,086,405 | 4/1978 | Gadessaud | 429/253 |
| 4,157,423 | 6/1979 | Gadessaud | 429/249 X |
| 4,277,572 | 7/1981 | Fujiwara et al. | 429/249 X |
| 4,505,998 | 3/1985 | Hsu et al. | 429/249 X |

Primary Examiner—Anthony Skapars
Attorney, Agent, or Firm—Burgess, Ryan & Wayne

[57] ABSTRACT

A battery separator comprising a sheet material containing a polyvinyl alcohol cross-linked by a cross-linking group of the general formula (I):

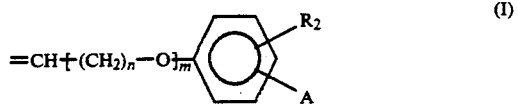

wherein A represents a group of —CH=CH—$R_1$ or

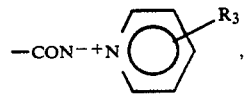

$R_1$ represents an optionally substituted quaternary nitrogen-containing aromatic heterocyclic group, $R_2$ and $R_3$ independently represent a hydrogen atom or alkoxy group having 1 to 4 carbon atoms, m is 0 or 1, and n is an integer of 1 to 6, is disclosed.

The separator exhibits a good resistance to electrolyte, electrolyte holding rate, and resistant to short-circuits.

11 Claims, 3 Drawing Sheets

BATTERY SEPARATOR AND A BATTERY

BACKGROUND THE INVENTION

1. Field of the Invention

The present invention relates to a battery separator and a battery, particularly, an alkaline battery separator and an alkaline primary or secondary battery containing the same.

2. Description of the Related Art

Separators have been used to separate the positive and negative electrodes of alkaline batteries for preventing short-circuits and holding the electrolyte to smoothly cause an electromotive reaction.

Hitherto, the separators of the alkaline secondary batteries were in the form of woven or nonwoven fabrics. The fibers constituting the woven or nonwoven fabric were generally polyamide fibers, and further, an alkaline electrolyte such as potassium hydroxide was used. Therefore, the fibers would become eroded away by the electrolyte with time, and short-circuiting would be caused between the positive and negative electrodes.

To avoid such defects, separators of polyolefin fibers such as polypropylene fibers were also used. Polyolefin fibers, however, are hydrophobic and lack in affinity with the electrolyte, so there was the problem of a poor electrolyte holding rate.

Further, even if separators of the above polyamide or polyolefin fiber were used, there still was the problem of short-circuiting caused by the deposition of branch-like metal crystals on the electrode plates, that is, dendrites, during discharging and/or charging, and therefore, a lifetime became shorter.

In the meanwhile, conventional alkaline primary battery separators were in the form of nonwoven fabrics, paper, or the like. The nonwoven fabrics or paper were generally made of vinylon or polyvinyl alcohol fibers, and an alkaline electrolyte such as potassium hydroxide was used. Therefore, the fibers would become eroded away by the electrolyte with time, and short-circuiting would be caused between the positive and negative electrode.

Further, mercerized pulp, linter pulp or the like was used to enhance the electrolyte holding rate by the separator. However, the impurities contained in the pulp and/or aluminum added to the zinc constituting the negative electrode to prevent the generation of hydrogen in the electrolyte brought about the deposition of zinc oxide dendrites on the electrode plates to cause short-circuiting, then in turn cause an abnormal reduction of the voltage, and thus a lifetime became shorter.

SUMMARY OF THE INVENTION

Accordingly, an object of the present invention is to provide a battery separator, particularly, an alkaline battery separator, resistant to erosion by an electrolyte.

Another object of the present invention is to provide a battery separator which is resistant to short-circuits caused by deposition of branch-like metals and which has a long lifetime.

A further object of the present invention is to provide a battery separator having a good electrolyte holding rate.

Other objects and advantages of the present invention will be apparent from the following description.

In accordance with the present invention, there is provided a battery separator comprising a sheet material containing a polyvinyl alcohol cross-linked by a cross-linking group of the general formula (I):

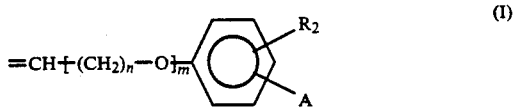

wherein A represents a group of $-CH=CH-R_1$ or

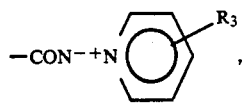

$R_1$ represents a nitrogen-containing aromatic heterocyclic group which may be substituted, $R_2$ and $R_3$ independently represent a hydrogen atom or an alkoxy group having 1 to 4 carbon atoms, m is 0 or 1, and n is an integer of 1 to 6.

In accordance with the present invention, there is also provided a primary or secondary battery containing the above separator.

DETAILED DESCRIPTION OF THE PREFERRED EMBODIMENTS

Figure 1:
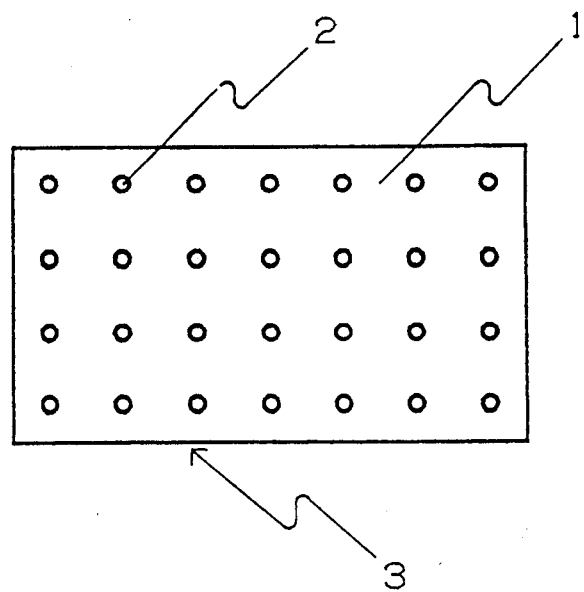
FIG. 1 is a schematic front view of a separator in accordance with one embodiment of the present invention.

The battery separator, particularly, the alkaline battery separator, of the present invention comprises a sheet material containing a polyvinyl alcohol having a cross-linked network structure, so is hardly decomposed by an alkaline electrolyte such as potassium hydroxide and can be used for a long period of time. Further, the sheet material of the present separator contains a cross-linked structure and thus exhibits good resistance to heat as well. For example, even if the present separator is used in an alkaline secondary battery, it can withstand high temperature conditions such as trickle charging.

In the above formula (I), the group $R_1$ is preferably a 5- or 6-membered aromatic heterocyclic group which contains one or two nitrogen atoms and optionally an oxygen of sulfur atom as one or more hetero atoms, and which may be condensed with a benzene ring. As examples of the group $R_1$, there may be mentioned pyridyl (e.g., 2-, 3- or 4-pyridyl); quinolyl (e.g., 2-, 4- or 8-quinolyl); isoquinolyl (e.g., 1-, 4- or 8-isoquinolyl); pyrimidinyl (e.g., 2-, 4- or 5-pyrimidinyl); thiazolyl (e.g., 2-, 4- or 5-thiazolyl); benzthiazolyl (e.g., 2-, 4- or 7-thiazolyl); or benzoxazolyl (e.g., 2-, 4- or 7-thiazolyl) group. The group $R_1$ is quarternized at the ring nitrogen atom substituted by, for example, an alkyl group having 1 to 4 carbon atoms which may be substituted by a sulfonic acid group, Further, the group $R_1$ may be substituted at one or more ring carbon atoms by one or more alkyl groups having 1 to 4 carbon atoms, alkoxy groups having 1 to 4 carbon atoms, amino groups or carbamoyl groups. The groups $R_2$ and $R_3$ may independently be hydrogen or alkoxy groups such as methoxy, ethoxy, n-propoxy, or isopropoxy group. The typical examples of the cross-linking group are as follows:

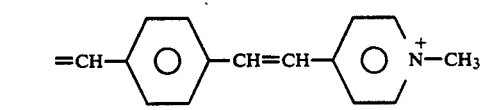
(1)

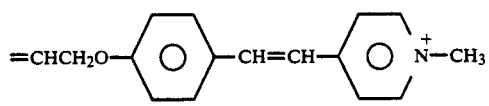
(2)

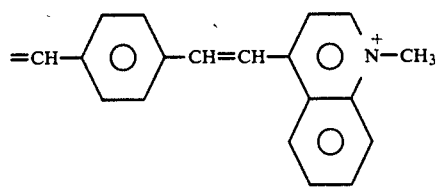
(3)

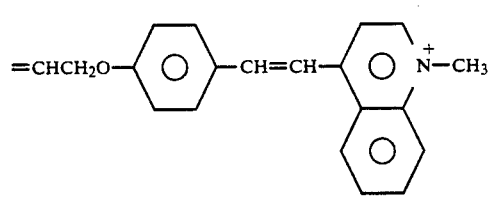
(4)

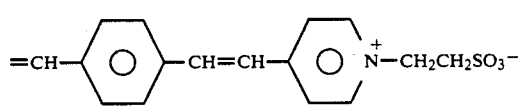
(5)

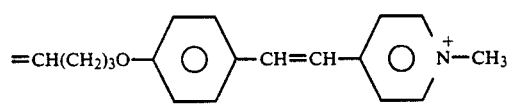
(6)

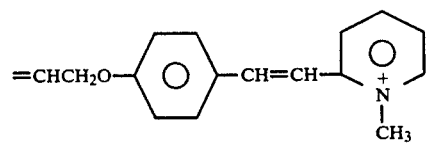
(7)

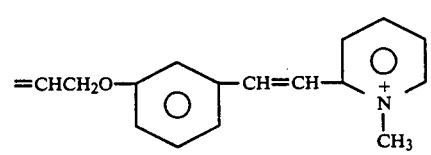
(8)

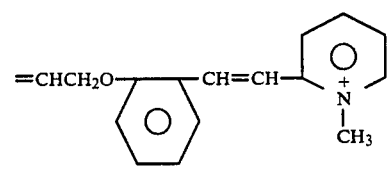
(9)

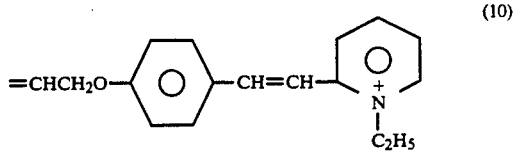
(10)

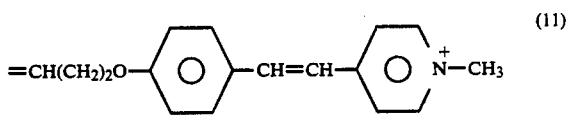
(11)

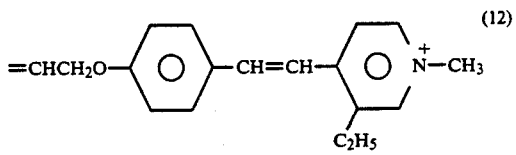
(12)

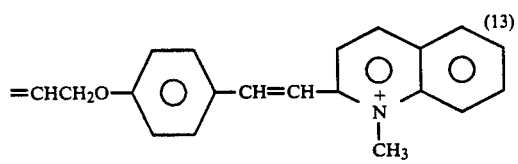
(13)

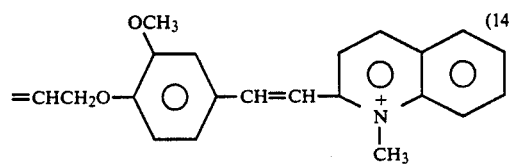
(14)

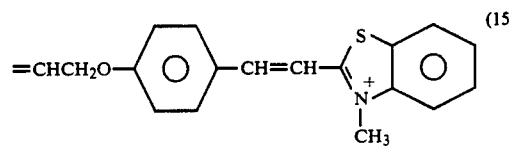
(15)

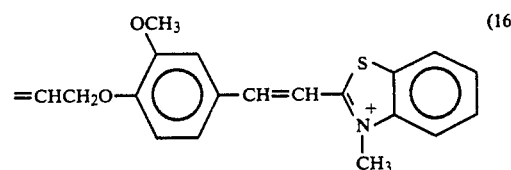
(16)

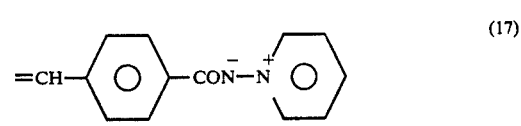
(17)

The cross-linked polyvinyl alcohol used in the present invention may be prepared by inserting the cross-linking groups into monomers, polymerizing the resulting monomers, and cross-linking the resulting polymers. Further, the cross-linked polyvinyl alcohol may be prepared by inserting the cross-linking groups into polymers, and then, cross-linking the resulting polymers. The polyvinyl alcohol having the above cross-linking groups may be cross-linked by light.

The cross-linked polyvinyl alcohol has hydroxy groups which can form a chelate. When the cross-linked polyvinyl alcohol is contained in the separator used in a battery, ions in the electrolyte are caught by the hydroxy groups to form chelates, instead of deposition of branch-like metals on the electrode plates, during discharging and/or charging, and therefore short-circuits are prevented, and thus, a lifetime can be prolonged. Further, polyvinyl alcohol has good affinity with the electrolyte and excellent electrolyte holding rate.

It is particularly preferable to use polyvinyl alcohol having one of the above-mentioned cross-linking groups in an amount of about 1 to 20 molar percent with respect to the monomer units of the polyvinyl alcohol, because about 1 to 20 molar % of the cross-linking groups can impart a superior resistance to the electrolyte and heat, and thus, 99 to 80 molar % of the hydroxy groups can remain for forming chelates with the ions and providing superior affinity to the electrolyte. Further, polyvinyl alcohol having one of the above-mentioned cross-linking groups can easily be cross-linked using light. It is preferable to use polyvinyl alcohol having saponification degree of 70 to 100, and polymerization degree of 500 or more, more preferably 1500 or more.

In the cross-linked polyvinyl alcohol, some hydroxy groups may be substituted by one or more acyl groups having 1 to 4 carbon atoms, such as formyl, acetyl, propionyl, butylyl of isobytylyl group. The cross-linked polyvinyl alcohol may be rendered more flexible by the above acylation, and therefore, breakage during the assembling process may be prevented and handling becomes easier. It is preferable to adjust the total amount of the cross-linking groups and the acyl groups in the range of 20 molar % or less with respect to the monomer unit of the polyvinyl alcohol. When the total amount is more than 20 molar %, the ratio of the hydroxy groups is lowered, and thus, it becomes difficult to form chelates and the electrolyte holding rate is reduced.

The cross-linked polyvinyl alcohols having a formyl group as the acyl group may be schematically illustrated as follows:

linked polyvinyl alcohol may be applied to the substrate by any conventional methods, for example, impregnation, coating or spraying in the form of a liquid thereof, or lamination in the form of a sheet thereof.

It is preferable to use the nonwoven fabric as the substrate, because the nonwoven fabric is porous and has a large surface, and thus, may carry many cross-linked polyvinyl alcohols and many hydroxy groups capable of forming a chelate. Further, it is because that there may be used the nonwoven fabric having various properties which may be imparted by various methods. For example, a nonwoven fabric prepared by a spun-bonding method has good strength, and may be avoided from being damaged during the assembling process. A nonwoven fabric prepared by a melt-blowing method has a dense structure, and may prevent short-circuit caused by deposition of branch-like metals. A nonwoven fabric prepared by an entangling method, such as a water-entangling or needle-punching method, has good resilience in the direction of thickness, because fibers are oriented generally in the direction of thickness. Therefore, when the electrode is expanded particularly in a secondary battery, the electrolyte which is held therearound is hardly released and an electromotive reaction can smoothly proceed. In the case of a nonwoven fabric prepared by a partially heat-pressing method, the cross-linked polyvinyl alcohol is mainly adhered to the portions partially heat-pressed. Therefore, the portions which have not been heat-pressed exhibit good permeability of ions and oxygen gas. A nonwoven fabric prepared by a wholly heat-pressing method is thin, and can reduce the space thereof in a battery. Therefore, the space for the electrodes can be increased and the capacity of the battery can be enhanced.

It is preferable to use a wet-laid nonwoven fabric as the substrate, because the wet-laid nonwoven fabric has

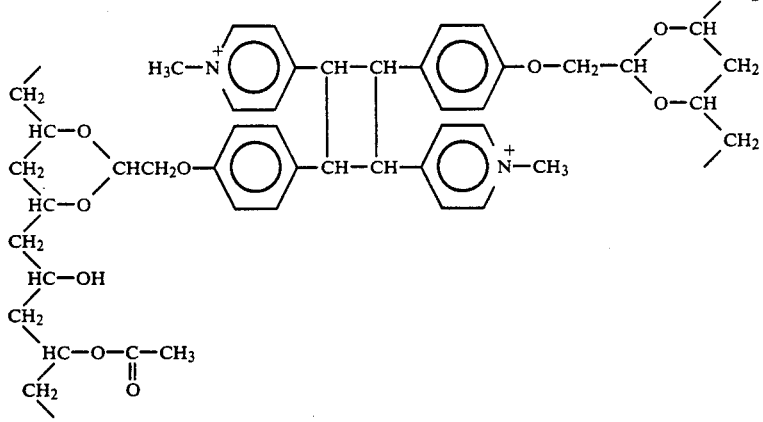

The separator of the present invention comprises a sheet material containing the cross-linked polyvinyl alcohol as mentioned above. The sheet material may comprise (i) a substrate made of one or more materials other than the cross-linked polyvinyl alcohol and (ii) the cross-linked polyvinyl alcohol. Further, the sheet material may also comprise a substrate made of the cross-linked polyvinyl alcohol alone.

As the substrate, there may be used woven fabrics, knitted fabrics, nonwoven fabrics, yarn lace, nets, flat braids, films, microporous films, or the like. The crossa dense structure, and can mechanically prevent short-circuit to prolong the lifetime, even if branch-like metals are deposited. The separator containing such a wet-laid nonwoven fabric may be prepared by forming a web by a wet-laid method simultaneously with binding the web by the polyvinyl alcohol having cross-linking groups; or by first forming a web by a wet-laid method and then binding the resulting web by the polyvinyl alcohol having cross-linking groups. The former manufacturing process is more preferable, because the polyvinyl alcohol having cross-linking groups acts as a binder of fibers.

In the preferred embodiment of the present invention, the sheet material comprises a hydrophilic portion and a hydrophobic portion. When the hydrophobic portion accounts for 10% or less in the sheet material, the separator comprising such sheet material exhibits good permeability of oxygen gas, and an electromotive reaction is not inhibited. The hydrophilicity stems from the cross-linked polyvinyl alcohol, and thus, the separator comprising such sheet material exhibits a good electrolyte holding rate and resistance to an electrolyte.

Because the separator comprising the above sheet material contains the hydrophilic and the hydrophobic portions, most electrolyte is concentrated into the hydrophilic portion other than the hydrophobic portion, and so the hydrophobic portion becomes comparatively poor in the electrolyte. Therefore, oxygen gas generated in the positive electrode can pass through the hydrophobic portion having higher permeability, reach into the negative electrode, and be consumed there. Accordingly, it is possible to avoid the increase of the internal pressure in the battery, and a burst thereof.

The substrate of this embodiment may be formed from a hydrophilic or hydrophobic material, but preferably hydrophobic material in view of the permeability of oxygen gas in the hydrophobic portion. As the hydrophobic materials, there may be preferably used polyolefin (such as polyethylene of polypropylene), polyphenylene sulfide, or polytetrafluoroethylene fibers, because of good resistance to electrolyte.

The substrate of this embodiment may be prepared from the above materials in the form of, for example, woven fabrics, knitted fabrics, nonwoven fabrics, yarn lace, nets, flat braids, or the like, as above.

The hydrophilicity or hydrophobicity of the separator comprising the sheet material may be imparted by hydrophilic or hydrophobic material per se. Further, when the substrate mainly consists of a hydrophilic material, hydrophobicity must be imparted, and when the substrate mainly consists of a hydrophobic material, hydrophilicity must be imparted. For example, when the substrate mainly consists of a hydrophobic material such as polypropylene, the separator comprising the sheet material may be prepared by protecting both sides of the portions to impart hydrophobicity by fusing films of polyethylene or the like or coating hydrophobic resin; imparting hydrophilicity by, for example, impregnating, adhering or applying hydrophilic resin; and then removing the protective films or resins. Further, it is more preferable to apply a water-repellant such as fluoride or silicone water-repellant to the hydrophobic portions for enhancing hydrophobicity thereof. Further, when the substrate mainly consists of a hydrophilic material, the separator comprising the sheet material may be prepared by the similar manner.

When the hydrophobic portion accounts for 10% or less in the separator comprising the sheet material, the electrical resistance due to the hydrophobic portion is hardly increased, and the separator comprising the sheet material exhibits excellent permeability of oxygen gas. The ratio of the hydrophobic portion is more preferably 5% or less, and most preferably 3% or less. When the hydrophobic portion accounts for less than 0.5%, the permeability of oxygen gas is lowered, and therefore, the ratio of the hydrophobic portion is preferably 0.5% or more. The hydrophobic portion is preferably dispersed evenly all over the separator comprising the sheet material, because the localization of the hydrophobic portion is liable to increase of the electrical resistance, and deteriorate the permeability of oxygen gas.

In the another preferred embodiment of the present invention, the sheet material comprises a substrate in the form of a microporous film of the cross-linked polyvinyl alcohol. The sheet material of this embodiment is not eroded away by an electrolyte, and can hold an electrolyte. It is preferable to adjust the thickness of the film in the range of 120 $\mu$m of less, because the active materials filled in the electrodes may be increased, and a battery with a high capacity can be produced. The film has micropores to permit the ions in the electrolyte to pass therethrough. In particular, such micropores should be provided when used in a secondary battery, because oxygen gas generated upon overcharging in one electrode should be moved to the other electrode and consumed there.

The microporous film of the cross-linked polyvinyl alcohol may be prepared by adding a phase-separating agent such as polyethylene glycol to polyvinyl alcohol before cross-linking, forming a film, and then removing the phase-separating agent.

The microporous film of the cross-linked polyvinyl alcohol may be laminated on the other film as a substrate to produce a sheet material which has an enhanced strength, and is easily dealt with. Further, because the distance between the electrodes becomes wider by the other film as the substrate, short-circuit caused by deposition of branch-like metals can more easily be avoided. The other film as the substrate should be microporous as the above polyvinyl alcohol film, because the ions in the electrolyte can pass therethrough. Further, micropores should be provided when used in a secondary battery, because oxygen gas generated upon overcharging in one electrode should be moved to the other electrode and consumed there.

In the case that the polyvinyl alcohol film is laminated on the other film as the substrate, it is preferable to adjust the thickness of the whole film in the range of 120 $\mu$m or less, because the active materials filled in the electrodes may be increased, and a battery with a high capacity can be produced.

It is preferable to prepare the other film as the substrate from polyolefin, such as polyethylene or polypropylene, because of erosion resistance to the electrolyte. Further, the polyolefin film has a poor electrolyte holding rate, and therefore, it is preferable to impart hydrophilicity to the polyolefin film by sulfonation, fluorination, treatment with a surfactant, or corona discharging treatment.

In the still another preferred embodiment of the present invention, the separator may contain one or more spacer layers laminated to the sheet material. By laminating one or more spacer layers to the sheet material, there may be obtained a separator which is more resistant to short-circuiting caused by deposition of branch-like metals and which has a prolonged lifetime. This is not only because chelates are formed with the ions before depositing as branch-like metals on the electrode plates during discharging and/or charging, and thus the branch-like metals hardly deposit by virtue of the sheet material, but also because even if the branch-like metals deposit, the growth of the deposited metals are inhibited and the distance between the electrodes becomes longer by one or more spacer layers. Therefore, the separator becomes more resistant to short-circuits. Namely, when the density of the spacer layer is high, deposition of branch-like metals is inhibited. Even when deposited, it is difficult to pierce the spacer layer. Conversely, even if the spacer layer has a low density and may easily be pierced by the branch-like metals, a long time is taken for growth of branch-like metals having a length corresponding to the thickness of the spacer layer. Therefore, the separator becomes more resistant to short-circuits.

The spacer layer which may be used in the present invention is, for example, woven fabrics, knitted fabrics, nonwoven fabrics, yarn lace, nets, flat braids, paper, microporous film, or the like. Of these spacer layers, nonwoven fabrics obtained by the melt-blowing method may be preferably used, because the diameter of the fibers thereof is small and the nonwoven fabric is dense, and so the growth of branch-like metals is inhibited, the branch-like metals are hard to pierce, and further, the electrolyte holding rate is excellent.

The material for the spacer layer is not limited. When the spacer layer is made of a polyamide resin, the spacer layer has a good affinity with electrolyte, and so has an excellent electrolyte holding rate. When the spacer layer is made of a polyolefin resin such as polypropylene resin, the spacer layer has a good resistance to electrolyte. Further, when the spacer layer is made of a hydrophobic resin, it is particularly preferable to enhance the electrolyte holding rate by hydrophilic treatment such as sulfonation, fluorination, treatment with a surfactant, or corona discharging treatment.

The spacer layer may be laminated on one side of the sheet material to form the separator, or on both sides thereof to further increase the distance between the electrodes and make short-circuiting caused by deposition of branch-like metals harder to occur. When the spacer layers each having similar shrinkage rate are used on the both sides of the sheet material, no warpage to one side will occur after laminating two spacer layers on both sides of the sheet material, and melting or heating and pressing to form a separator. Further, when the laminated separator having one or two hydrophobic spacer layers is used in a closed type alkaline secondary battery, the advantage is obtained that the oxygen generating in the positive electrode is easily consumed in the negative electrode, because the electrode surface is not intimately covered with the electrolyte.

The separator comprising a laminate of the sheet material and one or more spacer layers may be used after simply placing one on the other, or after partially or wholly bonding by an adhesive or melting at least one of the sheet material and the spacer layer to form a separator.

The above various types of the separators according to the present invention may be used in batteries, such as alkaline primary batteries or alkaline secondary batteries. For example, in the case of a cylindrical alkaline-manganese primary battery, the battery comprises a negative electrode portion containing a collector negative electrode of a copper or brass rod, and therearound a negative electrode depolarizing mixture layer prepared by adding an alkaline solution and a gelling agent such as carboxymethylcellulose to amalgamated zinc powder and then kneading; an positive electrode portion containing a positive electrode depolarizing mixture layer of a mixture of manganese dioxide and carbon powder and a nickel-plated steel plate outside of the positive electrode depolarizing mixture layer and acting as both a collector and a terminal of the positive electrode; and the alkaline battery separator of the present invention sandwiched between the negative electrode depolarizing mixture layer of the negative electrode portion and the positive electrode depolarizing mixture layer of the positive electrode so as to separate two layers. According to the present invention, it is possible to prevent short-circuits caused by deposition of branch-like metals, even in the case of an alkaline battery wherein zinc with low purity is used in a negative electrode as in an alkaline-manganese primary battery, instead of using mercury for preventing the leaching of the zinc. Therefore, the present separator is desired in the environmental standpoint of view. Further, there is no longer a need for use of pure zinc so as to avoid using mercury, and so the energy for obtaining pure zinc and the cost therefor can be saved.

Further, for example, in the case of a nickel-cadmium closed type secondary battery in a cylindrical shape, the separator of the present invention is interposed between the porous negative electrode mainly consisting of metallic cadmium particles and a porous positive electrode in which nickel hydroxide is filled, and the whole is wound in a spiral manner to form a cylindrical shape, inserted and sealed in a cylindrical case of nickel-plated steel together with the electrolyte.

Further, if the separator of the present invention is used in a nickel-hydrogen battery, it is possible to reduce self-discharge and a battery with a prolonged lifetime can be obtained. This is because the main cause for self-discharge in nickel-hydrogen batteries, i.e., the movement of metal leached from the hydrogen storage alloy electrode to the positive electrode, can be inhibited by the adsorption by the separator of the present invention. Because the separator of the present invention can adsorb leached metal, the same effect as above can be obtained in other secondary batteries as well.

The alkaline primary battery of the present invention is not limited as to its shape, and may be a cylindrical type of a button type. Further, the alkaline secondary battery of the present invention may be an open type or a closed type, and the shape thereof may be cylindrical, flat or angular. There is no limitation in these respects. Furthermore, the invention may be applied for alkaline-manganese batteries, a mercury battery, silver oxide battery, air battery, or other primary battery; or a nickel-cadmium battery, silver-zinc battery, silver-cadmium battery, nickel-zinc battery, nickel-hydrogen battery, and various other secondary batteries.

The alkaline battery separator of the present invention contains a cross-linked polyvinyl alcohol, so has a good resistance to electrolyte and heat resistance. Further, the cross-linked polyvinyl alcohol carries hydroxy groups which can form chelates, chelates can be formed with the ions before deposited as branch-like metals on the electrode surface. Therefore, short-circuits caused by deposition of the branch-like metals hardly occurs and the separator can be used for a long period of time. Further, the polyvinyl alcohol has hydroxy groups and has affinity with the electrolyte, and the separator can be used over a longer period of time.

The separator containing a dense nonwoven fabric prepared by a wet-laid method as the substrate can mechanically prevent short-circuits between the electrode plates, even if the branch-like metals are deposited, and so can be used for a longer period of time.

In the case of the separator containing a hydrophilic and hydrophobic portions, most electrolyte is concentrated into the hydrophilic portion other than the hydrophobic portion, and so the hydrophobic portion becomes substantially free from the electrolyte. Therefore, oxygen gas generated in the positive electrode can pass through the hydrophobic portion having higher permeability, reach into the negative electrode, and be consumed there. Accordingly, it is possible to avoid the increase of the internal pressure in the battery, and a burst thereof.

In the case of the separator comprising a laminate sheet material with one or more spacer layers, not only does the sheet material make it difficult for the branch-like metals to deposit, but also, even if the branch-like metals deposit, the spacer layer inhibits the growth of the branch-like metals and extends the distance between the electrodes. Therefore, short-circuits become more hardly to occur. Further, if the spacer layer is made of a nonwoven fabric obtained by the melt-blowing method, the diameter of the fibers is small and the nonwoven fabric is dense, and thus, the growth of branch-like metals is inhibited and piercing becomes more difficult. Furthermore, the electrolyte holding capacity is also good.

As above, the separator of the present invention may efficiently inhibit the deposition of the branch-like metals and short-circuiting. Therefore, the batteries, for example, primary batteries such as alkali-manganese, mercury, silver oxide or air batteries, or second batteries such as nickel-cadmium, silver-zinc, silver-cadmium, nickel-zinc or nickel-hydrogen batteries wherein the separators are used have a prolonged lifetime.

EXAMPLES

The present invention now will be further illustrated by, but is by no means limited to, the following examples.

EXAMPLE 1

Polyvinyl alcohol containing 1 molar % of the styrylpyridinium cross-linking groups of the formula (1) with respect to the monomer units of the polyvinyl alcohol and 99 molar % of hydroxy groups capable of forming chelates was dissolved in water to obtain a 3% by weight aqueous solution in the non-cross-linked state. On the other hand, a sheath-core type conjugate fiber (1.5 denier) consisting of a core component of polypropylene and a sheath component of polyethylene was carded, then only the polyethylene component was melt to fuse fibers, whereby a nonwoven fabric (weight per unit area=75.0 g/m$^2$; thickness=0.18 mm) was obtained. The above polyvinyl alcohol aqueous solution was applied on the nonwoven fabric in an amount of 3.8 g/m$^2$ (as solids content), then ultraviolet light was irradiated by a high pressure mercury lamp for 1 hour to cross-link the polyvinyl alcohols, thereby obtaining a separator (weight per unit area=78.8 g/m$^2$; thickness=0.19 mm).

EXAMPLE 2

After carding 30% by weight of undrawn polyphenylene sulfide fibers and 70% by weight of drawn polyphenylene sulfide fibers, the resulting web was heated under pressure to melt and fuse the undrawn polyphenylene sulfide fibers and obtain a nonwoven fabric (weight per unit area=80.0 g/m$^2$; thickness=0.20 mm). The polyvinyl alcohol aqueous solution same as that used in Example 1 was applied to the nonwoven fabric in an amount of 3.8 g/m$^2$ (as solids content), then the procedures same as in Example 1 were repeated to cause cross-linking, thereby obtaining a separator (weight per unit area=83.8 g/m$^2$; thickness=0.21 mm).

EXAMPLE 3

A polypropylene nonwoven fabric (weight per unit area=41.5 g/m$^2$; thickness=0.097 mm) was prepared by a melt-blow method. The polyvinyl alcohol aqueous solution same as that used in Example 1 was applied to the nonwoven fabric in an amount of 7.3 g/m$^2$ (as solids content), then the procedures same as in Example 1 were repeated to cause cross-linking, thereby obtaining a separator (weight per unit area=48.8 g/m$^2$; thickness=0.104 mm).

COMPARATIVE EXAMPLE 1

A nonwoven fabric (weight per unit area=75.0 g/m$^2$; thickness=0.18 mm) prepared from the sheath-core type conjugate fiber same as that used in Example 1 was prepared and used as a separator.

EXAMPLE 4

The polyvinyl alcohol same as that used in Example 1 was dissolved in water to obtain a 5% by weight aqueous solution thereof in a non-cross-linked state.

On the other hand, 50% by weight of polyamide (66 Nylon) fibers (1.5 denier) and 50% by weight of sheath-core type conjugate fibers (2 denier) comprising a core component of polyamide (6 Nylon) and a sheath component of a copolymer of polyamides (6 Nylon and 12 Nylon) were carded, then only the sheath component was melt to fuse, thereby obtaining an nonwoven fabric (weight per unit area=30.0 g/m$^2$; thickness=0.10 mm).

The above-mentioned polyvinyl alcohol aqueous solution was applied to the resulting nonwoven fabric in an amount of 6.0 g/m$^2$ (as solids content), then ultraviolet light was irradiated by a high pressure mercury lamp for 10 minutes to cross-link the polyvinyl alcohols, thereby obtaining a sheet material (weight per unit area=36.0 g/m$^2$; thickness=0.10 mm).

Further, the melt-blow process was used to obtain a fabric material as a spacer layer (weight per unit area=30.0 g/m$^2$; thickness=0.10 mm) of polyamide (6 Nylon) resin. The sheet material and the fabric material were laminated, then were heated for adhesion of each other at a temperature of 180° C. under a pressure of 4 kg/cm$^2$ to obtain a separator (weight per unit area of 66.0 g/m$^2$; thickness=0.20 mm).

EXAMPLE 5

Thirty percent by weight of undrawn polyphenylene sulfide fibers (2 denier) and 70% by weight of drawn polyphenylene sulfide fibers (2 denier) were carded, then heated to melt the undrawn polyphenylene sulfide to adhere each other, thereby obtaining a fabric material as a spacer layer (weight per unit area=30.0 g/m$^2$; thickness=0.10 mm). The resulting fabric material and a sheet material same as that used in Example 4 were laminated and heated for adhesion under the same conditions, thereby obtaining a separator (weight per unit area=66.0 g/m$^2$; thickness=0.20 mm).

EXAMPLE 6

Fifty percent by weight of polyamide (66 Nylon) fibers (1.5 denier) and 50% by weight of the sheath-core type conjugate fibers same as that used in Example 4 were subjected to a wet-laid method to prepare a nonwoven fabric, then only the sheath component of the sheath-core type conjugate fibers was melt for adhesion, thereby obtaining a fabric material (weight per unit area=30.0 g/m², thickness=0.10 mm). The resulting fabric material and the sheet material same as that used in Example 4 were laminated and heated for adhesion under the same conditions, thereby obtaining a separator (weight per unit area=66.0 g/m²; thickness=0.20 mm).

EXAMPLE 7

One hundred % by weight of a sheath-core type conjugate fibers (1.5 denier) consisting of a core component of polypropylene resin and a sheath component of polyethylene resin was carded, then only the sheath component was melted for adhesion, thereby obtaining a nonwoven fabric (a weight per unit area=30.0 g/m²; thickness=0.10 mm). The polyvinyl alcohol aqueous solution same as that used in Example 4 was applied to the resulting nonwoven fabric in an amount of 6.0 g/m² (as solids content), then ultraviolet light was irradiated by a high pressure mercury lamp for 10 minutes, thereby obtaining a sheet material (weight per unit area=36.0 g/m²; thickness=0.10 mm). Thereafter, the resulting sheet material was laminated with a fabric material (weight per unit area=30.0 g/m²; thickness=0.10 mm) obtained by the melt-blow method same as in Example 4, and consisting of polyamide (6 Nylon) resin, and then heated for adhesion at a temperature of 180° C. under a pressure of 4 kg/cm², thereby obtaining a separator (weight per unit area=66.0 g/m²; thickness=0.20 mm).

EXAMPLE 8

Fifty percent by weight of a sheath-core type conjugate fiber (1.5 denier) consisting of a core component of polypropylene and a sheath component of polyethylene and 50% by weight of a rayon fiber (2 denier) were carded, then only the polyethylene component of the sheath-core type conjugate fiber was melt for adhesion, thereby obtaining a nonwoven fabric (weight per unit area=57.0 g/m²; thickness=0.20 mm). The polyvinyl alcohol aqueous solution same as used in Example 1 was applied to the resulting nonwoven fabric in an amount of 3.0 g/m² (as solids content), then ultraviolet light was irradiated by a high pressure mercury lamp for 10 minutes to cause the polyvinyl alcohol to cross-link, thereby obtaining a separator (weight per unit area=60.0 g/m²; thickness=0.20 mm).

EXAMPLE 9

One hundred percent by weight of a sheath-core type conjugate fiber (1.5 denier) consisting of a core component of polypropylene and a sheath component of polyethylene was carded, then only the polyethylene component of the sheath-core type conjugate fiber was melt for adhesion, thereby obtaining a nonwoven fabric (weight per unit area=50.0 g/m²; thickness=0.10 mm). The polyvinyl alcohol same as used in Example 1 was applied to the resulting nonwoven fabric in an amount of 4.7 g/m² (as solids content), then ultraviolet light was irradiated by a high pressure mercury lamp for 10 minutes to cause the polyvinyl alcohol to cross-link, thereby obtaining a separator (weight per unit area=54.7 g/m²; thickness=0.10 mm).

EXAMPLE 10

Seventy percent by weight of vinylon fibers (0.5 denier) and 30% by weight of rayon fibers (0.5 denier) were subjected to the wet-laid method to prepare a nonwoven fabric (weight per unit area=30.0 g/m²; thickness=0.10 mm). The polyvinyl alcohol aqueous solution same as used in Example 1 was applied to the resulting nonwoven fabric in an amount of 2.0 g/m² (as solids content), then ultraviolet light was irradiated by a high pressure mercury lamp for 10 minutes to cross-link the polyvinyl alcohol, thereby obtaining a separator (weight per unit area=32.0 g/m²; thickness=0.10 mm).

COMPARATIVE EXAMPLE 2

Sixty percent by weight of vinylon fibers (1.0 denier), 30% by weight of rayon fibers (0.7 denier), and 10% by weight of polyvinyl alcohol fibers (1.0 denier) were subjected to the wet-laid method to prepare a nonwoven fabric (weight per unit area=30.0 g/m²; thickness=0.12 mm). The resulting nonwoven fabric was used as the separator.

Ion Adsorption Test

The metal salt of cadmium chloride, zinc chloride, aluminum chloride, cobalt chloride, or magnesium chloride was dissolved in the solvents shown in Table 1, respectively to obtain 0.1 mole per liter solutions. The separators obtained in Examples 1 to 3 and Comparative Example 1 were cut into a specimen having a size of 2 cm×5 cm. The specimens were immersed into the resulting solutions and allowed to stand for 24 hours. Thereafter, the separator specimens were washed with pure water to remove the ions which had not formed chelates. Then, the separator specimens were burnt to ashes in a platinum crucible, and the metal ions were extracted. The amounts of ion adsorption in a constant volume were measured by the atomic absorption spectrophotometry. The results are shown in Table 1.

TABLE 1

| Ion species | Solvent | Ion adsorption ($\times 10^2$ µg/g) | | | |
| --- | --- | --- | --- | --- | --- |
| | | Ex. 1 | Ex. 2 | Ex. 3 | Comp. Ex. 1 |
| $Cd^{2+}$ | Pure water | 1.6 | 2.3 | 9.0 | 0.37 |
| $Zn^{2+}$ | 30% KOH | 1.8 | 1.3 | 16.0 | 0.40 |
| $Al^{3+}$ | 30% KOH | 0.90 | 0.88 | 4.1 | 0.28 |
| $Co^{2+}$ | Pure water | 1.6 | 1.4 | 8.5 | 0.30 |
| $Mg^{2+}$ | Pure water | 0.58 | 0.65 | 2.5 | 0.10 |

Ex. = Example;
Comp. Ex. = Comparative Example.

Charging/Discharging Test of Batteries

Nickel-cadmium batteries having battery capacities of 1200 mAh were prepared, using the separators obtained in Examples 1 to 7 and Comparative Example 1. The cycle lifetime until the state where charging and discharging as a battery could no longer be performed was measured for the resulting batteries. In this test, 1 cycle consisted of charging for 4 hours at 400 mAh and then discharging at a constant resistance of 1 Ω. The measurement was performed at two temperatures of 20° C. and 60° C. for the separators of Examples 1 to 3 and Comparative Example 1, while the separators of Examples 4 to 7 were tested at 20° C. The results are shown in Table 2.

TABLE 2

| | Cycle lifetime (cycles) | |
| --- | --- | --- |
| | 20° C. | 60° C. |
| Ex. 1 | 1500 | 1300 |
| Ex. 2 | 1500 | 1400 |
| Ex. 3 | 1500 | 1300 |
| Comp. Ex. 1 | 1000 | 900 |

TABLE 2-continued

| | Cycle lifetime (cycles) | |
|---|---|---|
| | 20° C. | 60° C. |
| Ex. 4 | 1500 | |
| Ex. 5 | 1400 | |
| Ex. 6 | 1400 | |
| Ex. 7 | 1500 | |

Ex. = Example;
Comp. Ex. = Comparative Example.

Discharging Test of Batteries

Alkaline manganese batteries (LR-6) having a mercuration degree of 1.0% wherein a low mercurated zinc active material was used were prepared, using the separators obtained in Examples 8 to 10 and Comparative Example 2. The resulting alkaline manganese batteries were discharged at 75 Ω for 100 hours and were measured as to their discharge voltage before and after discharging. The results are shown in Table 3. As apparent from Table 3, the discharge voltages after discharging was high in the alkaline manganese batteries wherein the separators of the present invention were used. Therefore, it is manifest that short-circuits due to the deposition of branch-like zinc oxide which is believed to be caused by the low mercuration, can be prevented.

TABLE 3

| | Discharge voltage (V) | |
|---|---|---|
| | Before discharge | After discharge |
| Ex. 8 | 1.62 | 1.12 |
| Ex. 9 | 1.60 | 1.09 |
| Ex. 10 | 1.60 | 1.12 |
| Comp. Ex. 2 | 1.61 | 0.71 |

Ex. = Example;
Comp. Ex. = Comparative Example.

Self-Discharge Inhibition Test

A hydrogen storage alloy of $MnNi_{3.8}Co_{0.5}Al_{0.3}Mn_{0.4}$ was pulverized by adsorbing and desorbing gaseous hydrogen. The fine powder of the hydrogen storage alloy, nickel powder, and a polytetrafluoroethylene (Teflon) emulsion were mixed and kneaded to form a sheet, which was then wrapped by a nickel mesh, and press-molded to obtain a negative electrode of a nickel-hydrogen battery.

The separator obtained in Example 1 was sandwiched between the resulting negative electrode and a sintered type nickel electrode usually used as an positive electrode in a nickel-cadmium battery to prepare a plate electrode of 3×4 cm. The resulting plate electrode was inserted in a container and the container was filled with about 300 ml of an electrolyte comprising 6N potassium hydroxide and 1N lithium hydroxide to obtain a nickel-hydrogen battery having a 400 mAh capacity.

The resulting nickel-hydrogen battery was allowed to stand at room temperature for one day. Thereafter, the battery was repeatedly subjected to charging and discharging cycles consisting of charging at 40 mA for 12 hours, allowing to stand for 30 minutes as a rest period, and then discharging at 80 mA until reaching 0.8 V. As a result, the battery was activated.

After the activation of the battery was ascertained by the above method, the battery was charged at 40 mA for 12 hours (120% charging) and allowed to stand in a constant temperature vessel at 40° C. for 30 days. Thereafter, the battery was discharged at 80 mA until reaching 0.8 V, then the residual capacity was measured. The ratio of the residual capacity to the capacity at the time of activation is shown in Table 4. It is apparent that the separator of the present invention exhibits an excellent inhibition of the self-discharge. As comparative tests, the ratios of the residual capacities with the capacities at the time of activation were measured as above, and are shown in Table 4 for a separator consisting of a nonwoven fabric (weight per unit area=80.0 g/m²; thickness=0.2 mm) obtained as in Example 4 [Comparative Example 3]; a separator prepared by sulfonating a nonwoven fabric (weight per unit area=80.0 g/m²; thickness=0.2 mm) obtained as in Comparative Example 1 [Comparative Example 4]; and a separator prepared by applying a surfactant in an amount of 0.5% to a nonwoven fabric (weight per unit area=80.0 g/m²; thickness=0.2 mm) obtained as in Comparative Example 1 [Comparative Example 5].

TABLE 4

| | Residual capacity ratio* (%) |
|---|---|
| Ex. 1 | 90.0 |
| Comp. Ex. 3 | 66.6 |
| Comp. Ex. 4 | 79.0 |
| Comp. Ex. 5 | 74.9 |

Ex. = Example;
Comp. Ex. = Comparative Example.
*: The residual capacity ratio shows the ratio to the capacity at the time of activation.

EXAMPLE 11

A sheath-core type conjugate fiber (fineness=1.5 denier; fiber length=51 mm) consisting of a core component of polypropylene and a sheath component of polyethylene was carded, then only the polyethylene component was melt at 140° C. to fuse fibers, whereby a nonwoven fabric (weight per unit area=75.0 g/m²; thickness=0.18 mm) was obtained. The nonwoven fabric was inserted between two polyethylene films, and heat-seal treatment was carried out in both sides of the nonwoven fabric to form circular heat-sealed portions having diameter of 1 mm at an interval of 5.5 mm from each other in a lattice form. The total area of the hydrophobic portions protected by the heat-seald circles accounts for 2.5% in the nonwoven fabric.

On the other hand, polyvinyl alcohol containing 1 molar % of the styrylpyridinium cross-linking groups of the formula (1) with respect to the monomer units of the polyvinyl alcohol and 99 molar % of hydroxy groups capable of forming chelates was dissolved in water to obtain a 3% by weight aqueous solution in the non-cross-linked state. The above nonwoven fabric Partially masked with polyethylene films was impregnated with the above polyvinyl alcohol aqueous solution, irradiated with ultraviolet light by a high pressure mercury lamp for 10 minutes to cross-link the polyvinyl alcohols, and then dried (hydrophilic treatment). Thereafter, the polyethylene films were removed to obtain a separator (weight per unit area=125 g/m²; thickness=0.20 mm). As schematically illustrated in FIG. 1, the resulting separator 3 comprises the hydrophilic portion 1 and hydrophobic portions 2.

EXAMPLE 12

The procedure of Example 11 was repeated, except that the heat-sealed circles were placed at an interval of 3.8 mm, to obtain a separator 3 wherein the ratio of the hydrophobic portions in the nonwoven fabric was 5.3%.

EXAMPLE 13

The procedure of Example 11 was repeated, except that the heat-sealed circles were placed at an interval of 2.8 mm, to obtain a separator 3 wherein the ratio of the hydrophobic portions in the nonwoven fabric was 10.2%.

EXAMPLE 14

The procedure of Example 11 was repeated, except that the heat-seal treatment was not carried out, to obtain a separator 3 wherein the ratio of the hydrophobic portions in the nonwoven fabric was 0%.

EXAMPLE 15

After carding 30% by weight of undrawn polyphenylene sulfide fibers and 70% by weight of drawn polyphenylene sulfide fibers, the resulting web was heated for adhesion under pressure to melt and fuse the undrawn polyphenylene sulfide fibers and obtain a nonwoven fabric (weight per unit area=80.0 g/m$^2$; thickness=0.20 mm). The resulting nonwoven fabric was partially masked and subjected to the hydrophilic treatment as in Example 11 to obtain a separator wherein the ratio of the hydrophobic portions in the nonwoven fabric was 2.5% (weight per unit area=83.8 g/m$^2$; thickness=0.21 mm).

EXAMPLE 16

A nonwoven fabric made of polypropylene (weight per unit area=41.5 g/m$^2$; thickness=0.10 mm) prepared by a melt-blow method was partially masked and subjected to the hydrophilic treatment as in Example 11 to obtain a separator wherein the ratio of the hydrophobic portions in the nonwoven fabric was 2.5% (weight per unit area=48.8 g/m$^2$; thickness=0.11 mm).

Determination of Electrical Resistance

Figure 2:
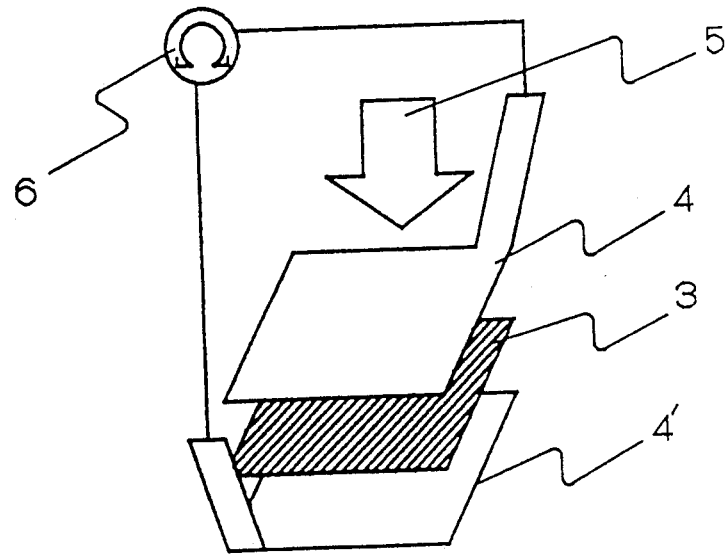
FIG. 2 is a schematic layout when electrical resistance of a separator is measured.

The separators 3 obtained in Examples 11 to 16 were cut to prepare specimens (3 cm×3 cm). As illustrated in FIG. 2, the separator specimen 3 was placed between two nickel plates 4, 4', and a load 5 of 1000 g was born thereto. Potassium hydroxide (specific weight=1.3) was poured thereto in an amount of 100% or 150% by weight, and electrical resistance was measured by milliohm-meter 6. The results are shown in Table 5. Further, the nonwoven fabric (weight per unit area=75.0 g/m$^2$; thickness=0.18 mm; without hydrophilic treatment) obtained in Example 11 was used as a conventional separator. The measurement result is also shown in Table 5 as Reference Example.

TABLE 5

| | Electrical Resistance (Ω) | |
|---|---|---|
| | 100 wt % electrolyte | 150 wt % electrolyte |
| Ex. 11 | 2.4 | 0.8 |
| Ex. 12 | 3.0 | 1.3 |
| Ex. 13 | 3.3 | 1.3 |
| Ex. 14 | 2.3 | 0.8 |
| Ex. 15 | 2.4 | 0.8 |
| Ex. 16 | 2.4 | 0.8 |
| Ref. Ex. | 2.4 | 0.9 |

Ex. = Example;
Comp. Ex. = Comparative Example;
Ref. Ex = Referential Example.

Determination of Permeable Resistance

Figure 3:
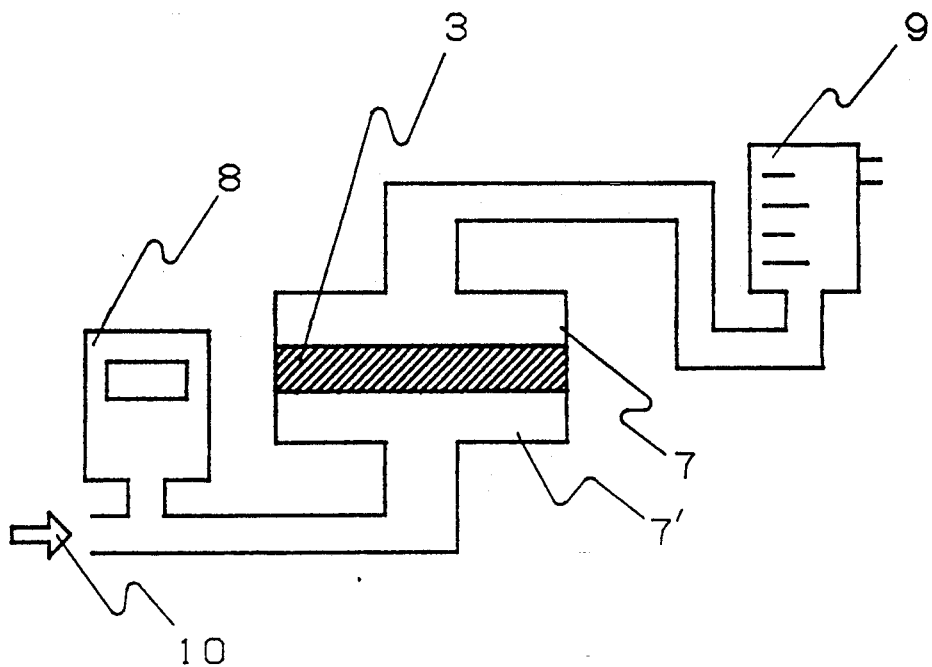
FIG. 3 is a schematic layout when permeability resistance of a separator is measured.
Figure 4:
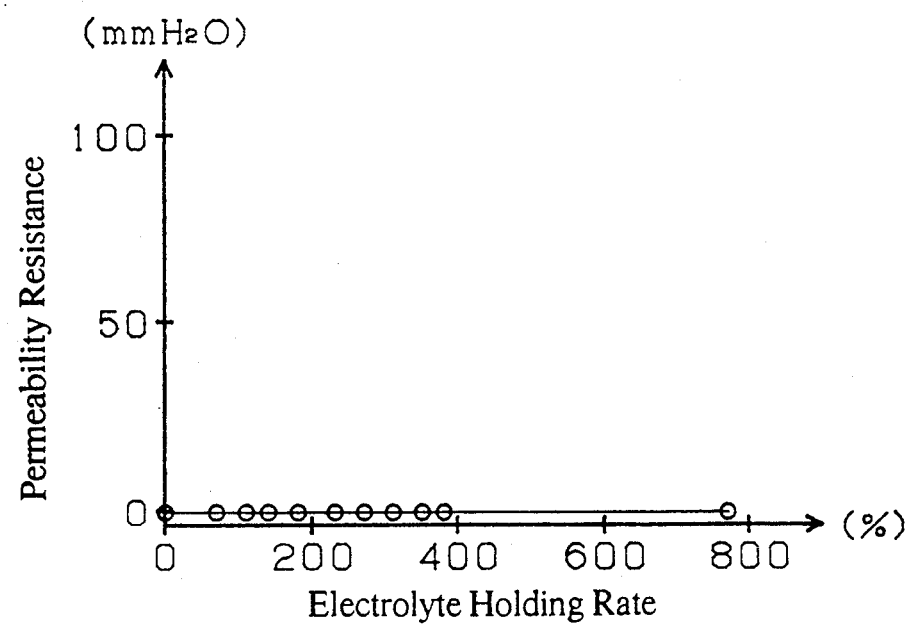
FIG. 4 shows permeability resistance of separators according to the present invention which separators comprise sheet materials having a hydrophilic portion and a hydrophobic portion.
Figure 5:
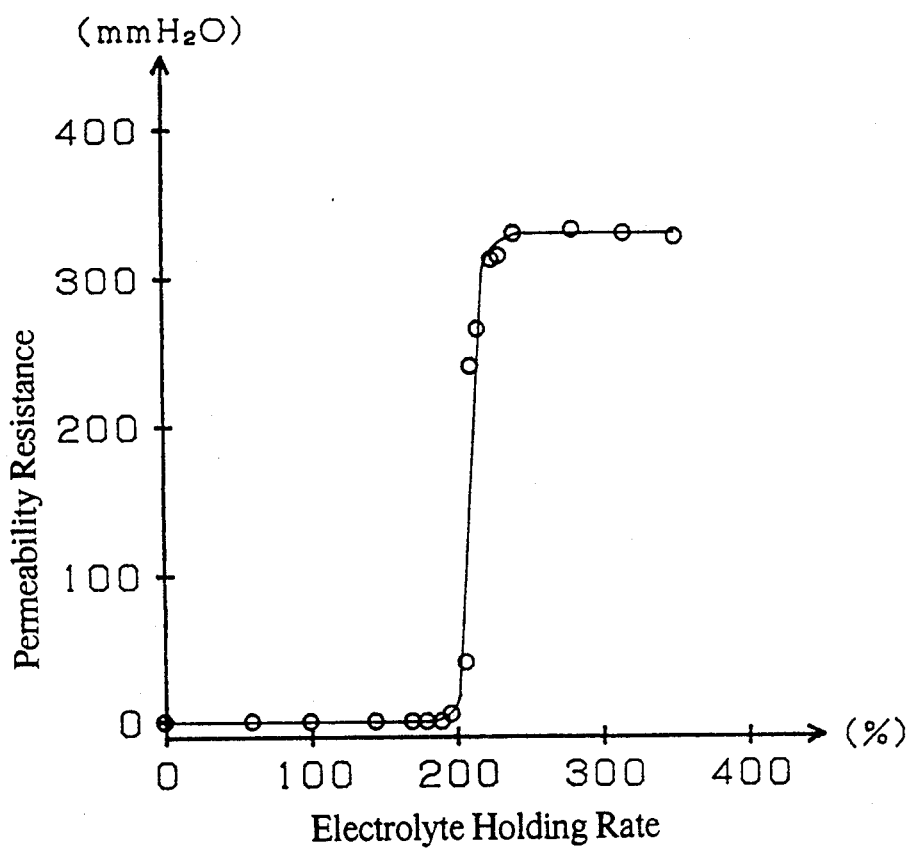
FIG. 5 shows permeability resistance of a separator which comprises a sheet material only having a hydrophilic portion.

The separators 3 obtained in Examples 11 to 16 were cut to prepare circular specimens (diameter=50 mm), the weights of which were measured. After pouring potassium hydroxide (specific weight=1.3) into the specimen, the specimen was placed between two polytetrafluoroethylene (Teflon) holders 7, 7', and then, pressurized air 10 was pumped as illustrated in FIG. 3. The pressure at the first time that the pressurized air passed through the separator was measured by a manometer 8. The measurement was performed with varying the amount of potassium hydroxide poured. As shown in FIG. 4, the permeability resistance of the separators obtained in Examples 11 to 13 and 15 to 16 was not increased even if the electrolyte holding rate was increased. On the other hand, the permeability resistance of the separator obtained in Example 14 was suddenly increased around the electrolyte holding rate of 200%, as shown in FIG. 5. The "electrolyte holding rate" is a rate of the weight of potassium hydroxide poured to the weight of the separator.

Ion Adsorption Test

Polyvinyl alcohol containing 1 molar % of the styrylpyridinium cross-linking groups of the formula (1) with respect to the monomer units of the polyvinyl alcohol and 99 molar % of hydroxy groups capable of forming chelates was dissolved in water to obtain a 13% by weight aqueous solution in the non-cross-linked state. The resulting solution was coated on an acrylic plate by a metal coater, and dried at room temperature to form a film (thickness=0.1 mm) thereon. Then, ultraviolet light was irradiated to the film by a high pressure mercury lamp for 10 minutes to cross-link the polyvinyl alcohols (Run 1). Further, the other test was performed, using a polypropylene film (thickness=0.1 mm) as Run 2.

The metal salt of cadmium chloride, zinc chloride, aluminum chloride, cobalt chloride, magnesium chloride or manganese chloride was dissolved in the solvents shown in Table 6, respectively to obtain solutions having the concentrations as shown in Table 6. The films obtained in Run 1 and Run 2 were cut into a specimen having a size of 3 cm×3 cm. The specimens were immersed into the resulting solutions and allowed to stand for 24 hours. Thereafter, the film specimens were washed with pure water to remove the ions merely adhered on the surface but not formed chelates. Then, the film specimens were burnt to ashes in a platinum crucible, and the metal ions were extracted. The amounts of ion adsorption in a constant volume were measured by the atomic absorption spectrophotometry. The results are shown in Table 6.

TABLE 6

| Ion species | Solvent | Concentration of solution (molar/l) | Ion adsorption (μg/g) | |
|---|---|---|---|---|
| | | | Run 1 | Run 2 |
| Mg$^{2+}$ | Pure water | 0.1 | 230 | 3 |
| Co$^{2+}$ | Pure water | 0.1 | 720 | 9 |
| Al$^{3+}$ | 30% KOH | 0.1 | 410 | 6 |
| Mn$^{2+}$ | Pure water | 0.1 | 9300 | 7 |
| Zn$^{2+}$ | 30% KOH | 0.1 | 1300 | 7 |
| Zn$^{2+}$ | 30% KOH | 0.2 | 3000 | — |
| Zn$^{2+}$ | 30% KOH | 0.3 | 5100 | — |
| Zn$^{2+}$ | 30% KOH | 0.5 | 7000 | — |
| Cd$^{2+}$ | Pure water | 0.1 | 230 | 4 |
| Cd$^{2+}$ | Pure water | 0.05 | 120 | — |
| Cd$^{2+}$ | Pure water | 0.01 | 26 | — |

TABLE 6-continued

| Ion species | Solvent | Concentration of solution (molar/l) | Ion adsorption (μg/g) Run 1 | Run 2 |
|---|---|---|---|---|
| $Cd^{2+}$ | Pure water | 0.001 | 12 | — |
| $Cd^{2+}$ | 30% KOH | $8.9 \times 10^{-5}$ | 24 | — |

— = not determined.

EXAMPLE 17

Polyvinyl alcohol containing 1 molar % of the styrylpyridinium cross-linking groups of the formula (1) with respect to the monomer units of the polyvinyl alcohol and 99 molar % of hydroxy groups capable of forming chelates was dissolved in water to obtain a 3% by weight aqueous solution in the non-cross-linked state. On the other hand, a nonwoven fabric (weight per unit area=28.5 g/m²; thickness=0.13 mm) was obtained by a wet-laid method from a slurry containing 100% by weight of vinylon fibers (fineness=0.5 denier; fiber length=2 mm) dispersed therein. The resulting nonwoven fabric was impregnated in the above polyvinyl alcohol aqueous solution to apply the resin in an amount of 1.5 g/m² (as solids content), then ultraviolet light was irradiated by a high pressure mercury lamp for 10 minutes to cross-link the polyvinyl alcohols, thereby obtaining a separator (weight per unit area=30 g/m²; thickness=0.13 mm).

EXAMPLE 18

A nonwoven fabric (weight per unit area=28.5 g/m²; thickness=0.13 mm) was obtained by a wet-laid method from a slurry containing a dispersed mixture of 70% by weight of vinylon fibers (fineness=0.5 denier; fiber length=2 mm) and 30% by weight of rayon fibers (fineness=0.7 denier; fiber length=5 mm). As in Example 17, the above polyvinyl alcohol aqueous solution was applied to the resulting nonwoven fabric, and cross-linked to obtain a separator (weight per unit area=30 g/m²; thickness=0.13 mm).

COMPARATIVE EXAMPLE 6

A nonwoven fabric (weight per unit area=30 g/m²; thickness=0.13 mm) was obtained by a wet-laid method from a slurry containing a dispersed mixture of 65% by weight of vinylon fibers (fineness=1.0 denier; fiber length=2 mm), 30% by weight of rayon fibers (fineness=0.7 denier; fiber length=5 mm), and 5% by weight of polyvinyl alcohol fibers (fineness=1.0 denier; fiber length=5 mm). The resulting nonwoven fabric was used as a separator.

EXAMPLE 19

A nonwoven fabric (weight per unit area=75 g/m²; thickness=0.18 mm) was obtained by a wet-laid method from a slurry containing 100% by weight of polypropylene fibers (fineness=0.5 denier; fiber length=10 mm) dispersed therein. As in Example 17, the above polyvinyl alcohol aqueous solution was applied to the resulting nonwoven fabric and cross-linked to obtain a separator (weight per unit area=78.8 g/m²; thickness=0.18 mm).

EXAMPLE 20

A nonwoven fabric (weight per unit area=75 g/m²; thickness=0.18 mm) was obtained by a wet-laid method from a slurry containing a dispersed mixture of 60% by weight of polyamide (6 Nylon) fibers (fineness=0.8 denier; fiber length=10 mm) and 40% by weight of polyamide (6 Nylon) fibers (fineness=1.5 denier; fiber length=10 mm). As in Example 17, the above polyvinyl alcohol aqueous solution was applied to the resulting nonwoven fabric and cross-linked to obtain a separator (weight per unit area=78.8 g/m²; thickness=0.18 mm).

COMPARATIVE EXAMPLE 7

A nonwoven fabric (weight per unit area=75 g/m²; thickness=0.18 mm) was obtained by a wet-laid method from a slurry containing a dispersed mixture of 95% by weight of polypropylene fibers (fineness=0.5 denier; fiber length=10 mm) and 5% by weight of polyvinyl alcohol fibers (fineness=1.0 denier; fiber length=5 mm). The resulting nonwoven fabric was used as a separator.

COMPARATIVE EXAMPLE 8

A nonwoven fabric (weight per unit area=75 g/m²; thickness=0.18 mm) was obtained by a wet-laid method from a slurry containing a dispersed mixture of 55% by weight of polyamide (6 Nylon) fibers (fineness=0.8 denier; fiber length=10 mm), 40% by weight of polyamide (6 Nylon) fibers (fineness=1.5 denier; fiber length=10 mm) and 5% by weight of polyvinyl alcohol fibers (fineness=1.0 denier; fiber length=5 mm). The resulting nonwoven fabric was used as a separator.

Discharging Test of Batteries

Alkaline manganese batteries (LR-6) having a mercuration degree of 1.0% wherein a low mercurated zinc active material was used were prepared, using the separators obtained in Examples 17 and 18 and Comparative Example 6. The resulting alkaline manganese batteries were discharged at 75 Ω for 100 hours and were measured as to their discharge voltage before and after discharging. The results are shown in Table 7. As apparent from Table 7, the discharge voltages after discharging was high in the alkaline manganese batteries wherein the separators of the present invention were used. Therefore, it is manifest that short-circuits due to the deposition of branch-like zinc oxide which is believed to be caused by the low mercuration, can be prevented.

TABLE 7

| | Discharge voltage (V) | |
|---|---|---|
| | Before discharge | After discharge |
| Ex. 17 | 1.60 | 1.09 |
| Ex. 18 | 1.61 | 1.11 |
| Comp. Ex. 6 | 1.60 | 0.69 |

Ex. = Example;
Comp. Ex. = Comparative Example.

Charging/Discharging Test of Batteries

Nickel-cadmium batteries having battery capacities of 1200 mAh were prepared, using the separators obtained in Examples 19 and 20 and Comparative Examples 7 and 8. After activating the batteries, the cycle lifetimes until the state where charging and discharging as a battery could no longer be performed were measured for the resulting batteries. In this test, 1 cycle consisted of charging for 6 hours at 240 mAh, allowing to stand for 30 minutes, and then discharging at 240 mAh till the final voltage of 0.8 V. The measurement was performed in a constant temperature bath of 20° C. or 40° C. The results are shown in Table 8.

TABLE 8

| | Cycle lifetime (cycles) | |
|---|---|---|
| | 20° C. | 40° C. |
| Ex. 19 | 1500 | 1400 |
| Ex. 20 | 1500 | 1300 |
| Comp. Ex. 7 | 1000 | 900 |
| Comp. Ex. 8 | 1000 | 700 |

Ex. = Example;
Comp. Ex. = Comparative Example.

Ion Adsorption Test

Nine kinds of polyvinyl alcohol as shown in Table 9 were dissolved in water to obtain 13% by weight aqueous solutions in the non-cross-linked state. Each of the resulting solutions was coated on an acrylic plate by a metal coater and dried at room temperature to form a film (thickness=0.1 mm) thereon. Then, ultraviolet light was irradiated to the film by a high pressure mercury lamp for 10 minutes to cross-link the polyvinyl alcohols.

The resulting films were cut into a specimen having a size of 3 cm×3 cm. The specimens were immersed in a 0.1 mol/l cadmium aqueous solution and 30% potassium hydroxide aqueous solution and allowed to stand for 24 hours. Thereafter, the film specimens were washed with pure water to remove the ions merely adhered on the surface, but not formed chelates. Then, the film specimens were burnt to ashes in a platinum crucible, and the metal ions were extracted. The amounts of ion adsorption in a constant volume were measured by the atomic absorption spectrophotometry. The results are shown in Table 10.

TABLE 9

| | Polyvinyl Alcohol | | Cross-linking Groups | | |
|---|---|---|---|---|---|
| No. | Polymerization Degree | Saponification Degree | Kind* | Introduction rate (molar %) | Introduction of acyl group |
| 1 | 1700 | 88 | (1) | 1.3 | No |
| 2 | 1700 | 88 | (1) | 1.9 | No |
| 3 | 1700 | 88 | (1) | 2.7 | No |
| 4 | 1700 | 80 | (1) | 1.3 | No |
| 5 | 500 | 88 | (1) | 4.2 | No |
| 6 | 3500 | 88 | (1) | 1.3 | No |
| 7 | 1700 | 88 | (6) | 1.3 | Yes** |
| 8 | 1700 | 88 | (1) | 1.3 | Yes*** |
| 9 | 1700 | 88 | (2) | 1.3 | No |

*: formula number shown as above.
**: 1.3 molar % of acetaldehyde was reacted to PVA.
***: 4 molar % of butylaldehyde was reacted to PVA.

TABLE 10

| | Ion adsorption (μg/g) | |
|---|---|---|
| PVA No. | Cadmium | Zinc |
| 1 | 230 | 1300 |
| 2 | 120 | 1303 |
| 3 | 180 | 1037 |
| 4 | 130 | 1303 |
| 5 | — | 1322 |
| 6 | 710 | 1919 |
| 7 | 360 | 1191 |
| 8 | 510 | 1188 |
| 9 | — | 1324 |

— = not measured

EXAMPLE 21

Polyvinyl alcohol (polymerization degree=1,700, saponification degree=88) containing 1 molar % of the styrylpyridinium cross-linking groups of the formula (1) with respect to the monomer units of the polyvinyl alcohol and 99 molar % of hydroxy groups capable of forming chelates was dissolved in water to obtain a 13% by weight aqueous solution in the non-cross-linked state. To the resulting solution, polyethylene glycol was added in an amount of 10% by weight with respect to the solid content of polyvinyl alcohol. The resulting mixture was homogeneously foamed, and then coated on one side of a polypropylene microporous film (Celgard 3501: Daicel Chemical). Then, ultraviolet light was irradiated on the coated film by a high pressure mercury lamp for 3 minutes to cross-link the polyvinyl alcohols. After washing to remove polyethylene glycol and drying, a separator (weight per unit area=45 g/m$^2$; thickness=115 μm) was obtained. Electron micrographs showed about 50 to 100 μm of micropores therein.

EXAMPLE 22

The procedure of Example 21 was repeated except that the polyvinyl alcohol solution was coated on an acrylic plate to form a microporous film. After peeling from the acrylic plate, the resulting microporous film was used as a separator (weight per unit area=32 g/m$^2$; thickness=90 μm). Electron micrographs showed about 50 to 100 μm of micropores therein.

COMPARATIVE EXAMPLE 9

A polypropylene microporous film (Celgard 3501: Daicel Chemical: treated with surfactant) was used as a separator (weight per unit area=15 g/m$^2$; thickness=25 μm; maximum pore diameter=0.4×0.04 μm; porosity rate=45%).

Determination of Electrolyte Holding Rate

The separators obtained from Examples 21 and 22 and Comparative Example 9 were cut into specimens (10×10 cm), and the specimens were dipped in 30% potassium hydroxide aqueous solution. After 1 hour, the specimens were taken out and vertically hung for 15 minutes to remove potassium hydroxide aqueous solution which had not been held in the specimens. Thereafter, the weight was measured at a temperature of 20° C. and a humidity of 60% to determine an electrolyte holding rate (H). The an electrolyte holding rate (H) was calculated from the following equation:

$$H(\%) = (Wb - Wa)/Wa \times 100$$

wherein H denotes an electrolyte holding rate, Wa denotes a weight before dipping, and Wb denotes a weight after dipping. The results are shown in Table 11.

TABLE 11

| | Electrolyte Holding Rate (%) |
|---|---|
| Ex. 21 | 560 |
| Ex. 22 | 444 |
| Comp. Ex. 9 | 113 |

Ex. = Example;
Comp. Ex. = Comparative Example.

Although the present invention has been described with reference to specific embodiments, various changes and modifications obvious to those skilled in the art are deemed to be within the spirit, scope, and concept of the invention.

We claim:

1. A battery separator comprising a sheet material containing a polyvinyl alcohol cross-linked by a cross-linking group of the general formula (I):

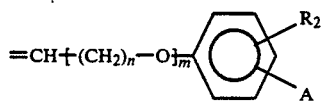  (I)

wherein A represents a group of —CH=CH—$R_1$ or

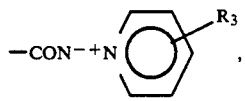, $R_1$ represents an optionally substituted quaternary nitrogen-containing aromatic heterocyclic group, $R_2$ and $R_3$ independently represent a hydrogen atom or alkoxy group having 1 to 4 carbon atoms, m is o or 1, and n is an integer of 1 to 6.

2. A battery separator according to claim 1, wherein the cross-linked polyvinyl alcohol is further substituted by an acyl group having 1 to 4 carbon atoms.

3. A battery separator according to claim 1, wherein the sheet material comprises a substrate carrying the cross-linked polyvinyl alcohol thereon.

4. A battery separator according to claim 3, wherein the substrate is made of a nonwoven fabric.

5. A battery separator according to claim 3, wherein the substrate is impregnated with the cross-linked polyvinyl alcohol.

6. A battery separator according to claim 1, wherein the sheet material comprises a hydrophilic portion and a hydrophobic portion.

7. A battery separator according to claim 1, wherein the sheet material is made of a polyvinyl alcohol film.

8. A battery separator according to claim 1, wherein the sheet material comprises a gas-permeable film and a polyvinyl alcohol film laminated thereto.

9. A battery separator according to claim 1, further comprising a spacer layer laminated to the sheet material.

10. A primary battery comprising an positive electrode, a negative electrode and a separator according to claim 1.

11. A secondary battery comprising an positive electrode, a negative electrode and a separator according to claim 1.

* * * * *